United States Patent [19]
Ishitobi et al.

[11] Patent Number: 6,005,126
[45] Date of Patent: Dec. 21, 1999

[54] SOLUBILIZING AGENT AND HYDROSOL COMPOSITION OBTAINED BY USING THE SAME

[75] Inventors: Masahiko Ishitobi; Toshiya Katsuragi; Tooru Tagawa, all of Yokohama, Japan

[73] Assignee: Mitsubishiki Chemical Corporation, Japan

[21] Appl. No.: 09/124,844

[22] Filed: Jul. 30, 1998

[30] Foreign Application Priority Data

Aug. 8, 1997 [JP] Japan ................................. 9-214662

[51] Int. Cl.⁶ .......................... C07C 53/126; C11C 3/02
[52] U.S. Cl. ............................... 554/227; 252/300
[58] Field of Search .................. 554/227; 252/300

[56] References Cited

U.S. PATENT DOCUMENTS

| | | | |
|---|---|---|---|
| 5,466,719 | 11/1995 | Jakobson et al. | 514/785 |
| 5,534,643 | 7/1996 | Endou et al. | 554/227 |
| 5,817,607 | 10/1998 | Duncan et al. | 554/227 |

FOREIGN PATENT DOCUMENTS

| | | |
|---|---|---|
| 5-310625 | 5/1993 | Japan . |
| 7-100355 | 7/1995 | Japan . |
| 7-308560 | 7/1995 | Japan . |
| 9-238619 | 9/1997 | Japan . |

OTHER PUBLICATIONS

Database WPI Section Ch Week 952418 Apr. 1995 Derwent XP002091240 & JP 07 100355.

Database WPI Section Ch Week 96027 Nov. 1995 Derwent XP002091241 & JP 07 289875 A.

*Primary Examiner*—James H. Reamer
*Attorney, Agent, or Firm*—Nixon & Vanderhye

[57] ABSTRACT

A solubilizing agent of the present invention comprises a polyglycerol fatty acid ester, an ester-constituting polyglycerol of the polyglycerol fatty acid ester comprising polyglycerol having a degree of polymerization of not less than 8 in an amount of not less than 70% by weight based on the weight of the ester-constituting polyglycerol. Such a solubilizing agent capable of solubilizing an oil-soluble material such as colorants, perfumes, vitamins, anti-oxidants, preservatives, germicides or fats and oils in an aqueous solvent, and a hydrosol composition containing the oil-soluble material solubilized in the aqueous solvent.

14 Claims, 4 Drawing Sheets

FIG.7 ent invention relates to a solubilizing agent and
SOLUBILIZING AGENT AND HYDROSOL COMPOSITION OBTAINED BY USING THE SAME

BACKGROUND OF THE INVENTION:

The present invention relates to a solubilizing agent and a hydrosol composition obtained by using the solubilizing agent, and more particularly, to a solubilizing agent capable of solubilizing an oil-soluble material such as colorants, perfumes, vitamins, anti-oxidants, preservatives, germicides or fats and oils in an aqueous solvent, and a hydrosol composition containing the oil-soluble material solubilized in the aqueous solvent.

Conventionally, in the fields of cosmetics, deodorants, bath agents, aromatizing agents, deodorizers, food, medicines or the like, various products exhibiting a liquid state at ordinary temperature have been prepared by solubilizing oil-soluble materials such as colorants, vitamins, anti-oxidants, preservatives, germicides or fats and oils in an aqueous solvent by using an emulsifier. However, in the case where these oil-soluble materials are solubilized in an aqueous solvent by using such an emulsifier, there have been caused the problem that the oil-soluble materials are separated from the aqueous solvent during the preparation of these products or during storage or transportation after the preparation thereof.

In order to solve such problems concerning oil/water separation, there have been conventionally proposed methods of adding polyhydric alcohols, surfactants or the like as a solubilizing agent to the aqueous solvent. Some of these methods have been already put into practice. Typical examples of conventionally proposed solubilizing agents include surfactants such as lecithin, polyoxyethylene sorbitan monooleate (nonionic surfactant), hardened castor oil ethylene oxide adducts, sucrose fatty acid esters or the like.

It is known that polyglycerol fatty acid esters (hereinafter occasionally referred to merely as "POGE") are safe emulsifiers usable for food, cosmetics or the like. In addition, there have been proposed solubilizing agents using the POGE. However, when an oil-soluble material is solubilized in an aqueous solvent by using the conventionally proposed POGE solubilizing agents, it has been required to further add other additives such as polyhydric alcohols. Further, it is necessary to use unsaturated fatty acids having a low stability independent to change with time as main constituting fatty acids of the POGE, thereby adversely affecting perfuming of cosmetics, distribution or storage of the goods or the like.

Also, in the preparation of the conventional solubilizing agents, there arises such a problem that in order to surely solubilize the oil-soluble substance in the aqueous solvent, it is necessary to use an emulsifier, a high-pressure homogenizer or the like capable of applying a strong shear force to a raw composition upon solubilizing operation. For these reasons, it has been demanded to develop solubilizing agents which are capable of solubilizing an oil-soluble material in an aqueous solvent by simple operation and maintaining the obtained solubilized products with a good stability for a long period of time, and do not adversely affect perfuming when applied to cosmetics.

On the aim for solving these problems, there have been proposed novel POGEs (Japanese Patent Applications Laid-open (KOKAI) Nos. 7-308560(1995), 7-100355(1995), 9-238619(1998) or the like). However, since these POGEs are insufficient in solubilizing property, it has been required to use a large amount of the POGE relative to that of an oil-soluble component to be solubilized.

As a result of the present inventor's earnest studies for solving the above-mentioned problems, it has been found that by using polyglycerol having a high degree of polymerization as a base polymer of polyglycerol fatty acid ester, it becomes possible to extremely readily solubilize an oil-soluble material in an aqueous solvent. The present invention has been attained by the finding.

SUMMARY OF THE INVENTION

It is an object of the present invention to provide a solubilizing agent exhibiting a higher solubilizing property for solubilizing an oil-soluble material in an aqueous solvent, and a hydrosol composition containing the solubilized oil-soluble material, which composition can be readily prepared, kept stable for a long period of time and used for food or the like because of excellent properties thereof.

To attain the aim, in a first aspect of the present invention, there is provided a solubilizing agent comprising a polyglycerol fatty acid ester, wherein an ester-constituting polyglycerol of the polyglycerol fatty acid ester comprises polyglycerol having a degree of polymerization of not less than 8 in an amount of not less than 70% by weight based on the weight of the ester-constituting polyglycerol.

In second aspect of the present invention, there are provided a solubilizing agent comprising a polyglycerol fatty acid ester, wherein an ester-constituting polyglycerol of the polyglycerol fatty acid ester comprises polyglycerol having a degree of polymerization of not less than 8 in an amount of not less than 90% by weight based on the weight of the ester-constituting polyglycerol.

In third aspect of the present invention, there are provided a solubilizing agent, wherein the ester-constituting polyglycerol of the polyglycerol fatty acid ester of the first or second aspect has an average degree of polymerization of not less than 18.

In fourth aspect of the present invention, there are provided a solubilizing agent comprising a polyglycerol fatty acid ester, wherein an ester-constituting polyglycerol of the polyglycerol fatty acid ester has an average degree of polymerization of 18 to 22, and comprises polyglycerol having a degree of polymerization of not less than 8 in an amount of not less than 90% by weight based on the weight of the ester-constituting polyglycerol.

In fifth aspect of the present invention, there are provided a solubilizing agent, wherein a percentage of esterification of the polyglycerol fatty acid ester of the first or second aspect is not more than 30%.

In sixth aspect of the present invention, there are provided a solubilizing agent, wherein the ester-constituting fatty acid of the polyglycerol fatty acid ester of the first or second aspect comprises a saturated fatty acid having 14 to 18 carbon atoms in an amount of not less than 70% by weight based on the weight of the ester-constituting fatty acid.

In a seventh aspect of the present invention, there is provided a hydrosol composition comprising an aqueous solvent, the solubilizing agent of any one of the first to six aspect and an oil-soluble material solubilized in the aqueous solvent by the solubilizing agent.

In an eighth aspect of the present invention, there is provided a hydrosol composition, wherein the weight ratio of said solubilizing agent to said oil-soluble material in the hydrosol composition of the seventh aspect is 10:1 to 1:4.

DETAILED DESCRIPTION OF THE INVENTION

The present invention is described in detail below.

The solubilizing agent (component A) according to the present invention may be used for solubilizing an oil-soluble material (component B) in an aqueous solvent (component C). Incidentally, the "solubilization" used in the present invention means preparing a thermodynamically stable solution by dispersing the oil-soluble material (component B) in the aqueous solvent (component C), or bringing the system into a state of homogeneous phase such as a micro-emulsion state. In addition, the "hydrosol" used in the present invention means the condition of colloidal solution containing water as a dispersing medium. Therefore, the "hydrosol" may be clearly distinguished from the "gel" condition in which colloidal particles lose an independent movability, and are agglomerated and solidified.

Component A

The component A (solubilizing agent) functions for solubilizing the component B (oil-soluble material) in the aqueous solvent, and comprises as an effective ingredient, a polyglycerol fatty acid ester (POGE) whose ester-constituting polyglycerol contains polyglycerol having a degree of polymerization of not less than 8 in an amount of not less than 70% by weight based on the weight of the ester-constituting polyglycerol. It is preferred that the ester-constituting polyglycerol of the POGE contains polyglycerol having a degree of polymerization of not less than 8 in an amount of not less than 90% by weight based on the weight of the ester-constituting polyglycerol. When the amount of the polyglycerol having a degree of polymerization of not less than 8 is less than 70% by weight, the solubilizing ability of the component A becomes disadvantageously lowered.

The average degree of polymerization of the ester-constituting polyglycerol of the POGE is preferably not less than 18, more preferably 18 to 22. When the average degree of polymerization of the ester-constituting polyglycerol is less than 18, the solubilizing ability of the component A may become unsatisfactory. On the other hand, when the average degree of polymerization of the ester-constituting polyglycerol is too large, the POGE is sometimes difficult to handle.

The percentage of esterification of the POGE is preferably not more than 30%, more preferably not more than 20%. When the percentage of esterification of the POGE is more than 30%, it may become difficult to form a stable solubilized system under an acid condition, for example, at a pH of not more than 3, thereby sometimes producing precipitates.

In general, polyglycerol may be produced by adding a small amount of acid or alkali as a catalyst to glycerol and heating glycerol at a temperature as high as not less than 180° C. under ordinary or reduced pressure. If required, after completion of the reaction, the obtained polyglycerol may be subjected to treatments such as neutralization or desalting. As the commercially available polyglycerols, there may be exemplified those called "polyglycerol tetramer", "polyglycerol hexamer" or "polyglycerol decamer" according to its average degree of polymerization calculated from a hydroxyl value thereof. However, these polyglycerols may be actually in the form of a mixture of various glycerol polymers having a degree of polymerization of usually 1 to about 30, preferably 1 to 10.

The ester-constituting polyglycerol used in the present invention, which contains polyglycerol having a degree of polymerization of not less than 8 in an amount of not less than 70% by weight based on the weight of the ester-constituting polyglycerol, may be obtained by fractionating necessary components from the above-mentioned polyglycerols. The fractionating methods of polyglycerols are not particularly restricted, and as preferred fractionating methods, there may be exemplified a method of subjecting polyglycerols to chromatographic separation using a gel-type strong acid cation exchange resin having a polystyrene skeleton, as described in Japanese Patent Application Laid-open (KOKAI) No. 5-310625(1993). In order to industrially conduct such a chromatographic separation, the pseudo-moving bed chromatography may be suitably used.

It is preferred that the ester-constituting fatty acid of the POGE used in the present invention contains a saturated fatty acid having 14 to 18 carbon atoms in an amount of not less than 70% by weight based on the weight of the ester-constituting fatty acid of the POGE. When the carbon atoms of the saturated fatty acid is not less than 14 carbon atoms, the POGE can exhibit a good solubilizing force, and even though the POGE is added to food such as beverages, the flavor of food can be suitably maintained. Further, when the carbon atoms of the saturated fatty acid is not more than 18 carbon atoms, it becomes possible to form a stable solubilized system even when an oil-soluble material is solubilized under an acid condition, for example, at a pH of not more than 3. Specific examples of the saturated fatty acids having 14 to 18 carbon atoms may include myristic acid, palmitic acid, stearic acid or the like. These fatty acids may be used singly or in the form of a mixture of any two or more thereof. The ester-constituting fatty acid may contain a saturated fatty acid having 14 to 18 carbon atoms in an amount of not less than 70% by weight, preferably not less than 90% by weight based on the weight of the ester-constituting fatty acid of the POGE. When the amount of the saturated fatty acid having 14 to 18 carbon atoms is not less than 70% by weight, the flavor of food can be suitably maintained even during a long-term storage.

It is preferred that kinds of ester-constituting fatty acids used in the present invention can be appropriately selected from those having the above-mentioned content of saturated fatty acid whose carbon atoms lies within the above-mentioned range, upon determining raw materials for the production of the POGE.

The POGE used in the present invention may be produced by charging the above-defined saturated fatty acid and polyglycerol in a reaction vessel, and reacting these components at a temperature of 150 to 300° C. under ordinary pressure to several atoms in the presence of a catalyst. As the catalyst usable in the production of the POGE, there may be exemplified alkalis such as potassium hydroxide or sodium hydroxide. The amount of the catalyst used may be appropriately selected from the range of 0.001 to 0.025% by weight.

The component A (solubilizing agent) may contain, in addition to the POGE, a trace amount of sucrose fatty acid ester, sorbitan fatty acid ester, propyleneglycol fatty acid ester, organic acid mono-glyceride, fatty acid soap, lactic acid fatty acid ester, lecithin, saponin or the like. Also, these trace components may be used in combination with the POGE.

Component B

The component B may include materials which are inherently oil-soluble and substantially water-insoluble. The component B can be solubilized in an aqueous solvent by the action of the above-mentioned component A. As the component B, there may be exemplified colorants, perfumes, essential oils, oleoresins or resinoids, waxes, fatty acids or esters thereof with alcohols, vitamins, anti-oxidants, saturated or unsaturated higher alcohols, hydrocarbons, preservatives, germicides, or the like.

Specific examples of the colorants may include β-carotene, paprika pigments, annato pigments, safrole yellow, riboflavin, lac pigments, curcumin, chlorophyll, turmeric pigments or the like.

Specific examples of the perfumes may include orange oil, lemon grass oil, tarragon oil, avocado oil, laurel leaf oil, cassia oil, cinnamon oil, pepper oil, calamus oil, sage oil, mint oil, peppermint oil, spearmint oil, patchouli oil, rosemarry oil, rapanzin oil, lavender oil, curcuma oil, cardamom oil, ginger oil, angelica oil, anise oil, fennel oil, parsley oil, celery oil, karupanum oil, cumin oil, coriander oil, jil oil, carrot oil, caraway oil, wintergreen oil, nutmeg oil, rose oil, cypress oil, sandalwood oil, allspice, grapefruit oil, neroli oil, lemon oil, lime oil, bergamot oil, mandarin oil, onion oil, garlic oil, bitter almond oil, geranium oil, mimosa oil, jasmine oil, fragrant olive oil, star anise oil, cananga oil, ylang ylang oil, eugenol, ethyl caprylate, geraniol, menthol, citral, citronellal, borneol or the like.

Specific examples of the essential oils may include ambrette seed oil, mustard oil, saffron oil, citronella oil, vetiver oil, valerian oil, mugwort oil, camomile oil, camphor oil, sassafras oil, hosho oil, rosewood oil, clary sage oil, thyme oil, basil oil, carnation oil, cedar wood oil, cypress oil, white cedar leaf oil, clove oil, terpine oil, pine oil or the like.

Specific examples of the oleoresins or resinoids may include pepper, cardamom, ginger, parsley, coriander, caraway, pimento, vanilla, celery, clove, nutmeg, paprika, iris resinoid, frankincense, omonikus or the like.

Specific examples of the waxes may include jojoba oil, rice wax, propolis, beeswax, bleached beeswax, candelilla wax, carnauba wax, water wax, spermaceti wax, ceresin or the like.

Specific examples of the fatty acids and the esters of thereof with alcohols may include hexadecatrienoic acid, octadecatrienoic acid, eicosatetraenoic acid, docosatetraenoic acid, eicosapentaenoic acid, docosapentaenoic acid, docosahexaenoic acid, tetrahexaenoic acid, geometrical isomers of these acids, esters of these acids and alcohols or the like.

Specific examples of the anti-oxidants may include ascorbates, D,L-α-tocopherol, dibutylhydroxy toluene, butylhydroxy anisole, lead tree extracts, γ-oryzanol, clove extracts, catechins, gentisin oil, gossypetin, rice oil unsaponifiable matters, sesamolin, sesamonol, sage extracts, natural vitamin E, pimento extracts, pepper extracts, gallic acid derivatives, eucalyptus leaf extracts, rosemarry extracts or the like.

Specific examples of the saturated or unsaturated higher alcohols may include alcohols having 8 to 44 carbon atoms, such as lauryl alcohol, myristyl alcohol, cetanol, stearyl alcohol, oleyl alcohol, laurin alcohol, isostearyl alcohol, 2-octyldodecanol octacosanol or the like.

Specific examples of the hydrocarbons may include light liquid paraffins, heavy liquid paraffins, liquid isoparaffins, light liquid isoparaffins, ceresin, paraffins, macrocrystalline waxes, vaseline, squalane, squalene or the like.

Specific examples of the vitamins may include vitamin A, vitamin D, vitamin E, vitamin K or the like.

Specific examples of the preservatives and the germicides may include dehydroacetic acid or the like. These components B may be used singly or in the form of a mixture of any two or more thereof.

Component C

The component C is an aqueous solvent which comprises water, and is as a solvent for dissolving the solubilized oil-soluble material (component B) therein. As the component C, there is preferably used deionized water which has been subjected to ion exchange treatment to remove anions and cations therefrom.

The hydrosol composition according to the present invention which comprises an aqueous solvent (component C) and an oil-soluble material (component B) solubilized in the aqueous solvent, may be readily produced by weighing predetermined amounts of the above-mentioned solubilizing agent (component A) and the oil-soluble material (component B), mixing and agitating these components together under heating, and adding the resultant mixture to the aqueous solvent (component C) to solubilize the oil-soluble material in the aqueous solvent, followed by cooling to room temperature. In the production of the hydrosol composition, it is not necessary to conduct intense mechanical agitation of the composition, unlike conventional methods. Shaking operation can provide satisfactory results. However, as a matter of course, the present invention does not exclude to conduct such an intense mechanical agitation capable of applying a strong shear force to the hydrosol composition.

The weight ratio of the component A to the component B (A:B) is not particularly restricted, and may be usually in the range of 10:1 to 1:4, preferably 1:1 to 1:4, more preferably 1:2 to 1:4. The lower limit of the amount of the component B solubilized is not particularly restricted. However, when the amount of the component B is too small, the merits of the present invention may not be sufficiently exhibited because too large amount of the component A is used to solubilize only a small amount of the component B.

On the other hand, when the amount of the component B is too large, the component B may not be sometimes satisfactorily solubilized though the condition is varied depending upon kinds of the oil-soluble material (component B). For example, in the case where the pH of the hydrosol composition is less than 5, there may arise a problem that the oil-soluble material (component B) subjected to solubilization-treatment tends to be subsequently separated from the solvent due to unstableness thereof. Especially, under acid conditions, there may be caused problems such as formation of precipitates, so that it may be difficult to obtain a hydrosol composition in which the oil-soluble material is stably solubilized in the aqueous solvent.

In accordance with the present invention, by controlling the amount of the component A, it becomes possible to obtain a hydrosol composition which is kept stable not only under neutral conditions but also even under acid conditions, e.g., at the pH of 2 to 5, and is free from separation or precipitation of the component B solubilized. Since the pH of acid food is usually not less than 3.3, the hydrosol composition according to the present invention can be kept stable at such a pH.

From the standpoint of stableness of the obtained hydrosol composition at a low pH such as at a pH of not more than 5, the amount of the component B in the hydrosol composition is preferably 10 to 10,000 ppm, more preferably 10 to 5,000 ppm based on the total amount of the hydrosol composition.

In the hydrosol composition according to the present invention, it is essential that the component B (oil-soluble material) is solubilized in the aqueous solvent (component C) by the component A. Further, the hydrosol composition according to the present invention may contain other additives, if required.

As the other additives added or mixed, there may be exemplified water-soluble additives such as saccharides or polyhydric alcohols, pH controlling agents or the like. Specific examples of the saccharides or the polyhydric alcohols may include propylene glycol, glycerol, sorbitol, xylitol, arabitol, maltitol, lactitol, sorbitan, xylose, arabinose, mannose, lactose, sugar, coupling sugar, glucose, enzyme-saccharized starch syrup, maltose starch syrup, maltose, isomerized saccharides, fructose, reduced maltose starch syrup, honey or the like. Specific examples of the pH controlling agents may include citric acid, lactic acid, tartaric acid, succinic acid, malic acid, maleic acid, fumaric acid or the like. These other additives may be used singly or in the form of a mixture of any two or more thereof.

The amount of the other additives added or mixed in the hydrosol composition may be appropriately selected according to applications of the hydrosol composition.

The solubilizing agent according to the present invention can exhibit a high solubilizing property for oil-soluble materials and, therefore, is capable of solubilizing an oil-soluble material in an aqueous solvent even when used in a small amount. Accordingly, since the use of small amount of the solubilizing agent does not adversely affect taste, flavor and odor, the solubilizing agent of the present invention can be suitably applied to food, medicines, cosmetics or the like. Further, by using the solubilizing agent according to the present invention, even when the amount of the additives added is reduced, it becomes possible to produce a hydrosol composition of an oil-soluble material which is readily solubilized without the use of emulsifier or high-pressure homogenizer capable of applying a strong shear force thereto. The thus produced hydrosol composition of the oil-soluble material can be kept stable for a long period of time, and can be prevented from being deteriorated in quality during storage or distribution thereof. Furthermore, since the hydrosol composition substantially contain no materials such as polyhydric alcohols which adversely affect taste, flavor or odor, the hydrosol composition according to the present invention is applicable to food such as beverages, medicines, cosmetics and the like.

EXAMPLES

The present invention will now be described in more detail with reference to the following examples, but the present invention is not restricted to those examples and various modifications are possible within the scope of the invention.

Production Example 1

Commercially available decaglycerol (polyglycerol #750, produced by SAKAMOTO YAKUHIN CO., LTD.; average degree of polymerization: 10.9; content of components having a degree of polymerization of not less than 8: 33%) was treated under the following conditions using a modified pseudo-moving bed chromatograph separator, thereby producing polyglycerol from which polyglycerol components having a degree of polymerization of not more than 7 were removed.

Apparatus used

Chromatograph separator (manufactured by MITSUBISHI CHEMICAL ENGINEERING CO., LTD.)

Column: 2,450 ml×4

Resin used

UBK-530: Strong acid cation exchange resin containing, as a base material, polystyrene-divinyl benzene gel (produced by MITSUBISHI CHEMICAL CORP.; $Na^+$-type; average particle size: 230 to 240 $\mu$m; exchange capacity: 1.6 meq/ml)

Raw material separated

Decaglycerol #750 (polyglycerol #750, produced by SAKAMOTO YAKUHIN CO., LTD.; concentration: 45% by weight)

Eluting solution

Desalted water

Separation conditions

Continuous separation by the operation of semi-modified pseudo-moving bed; column temperature: 65° C.; flow rate:

60 ml/min)

Water was removed from the thus obtained aqueous solution of polyglycerol components having a high degree of polymerization by an evaporator to produce polyglycerol. The produced polyglycerol contained a component having a degree of polymerization of not less than 8 in an amount of not less than 90% by weight based on the weight of the ester-constituting polyglycerol, and had an average degree of polymerization of 21.3 when calculated from a hydroxyl value thereof.

Next, 212.7 g (0.134 mol) of the above-produced polyglycerol, stearic acid (stearic acid 750, produced by NIHON YUSHI CO., LTD., and containing 75% by weight of stearic acid and 25% by weight of palmitic acid), and a 10% sodium hydroxide aqueous solution were charged into a reaction vessel, such that the molar ratio of fatty acid to polyglycerol charged was 1:1 and the amount of sodium hydroxide was 0.0025% by weight based on the total weight of these components charged. The components charged were reacted with each other in a nitrogen stream under ordinary pressure at 240° C. for 2.5 hours. Thereafter, the reaction mixture was heated to 260° C. and further reacted for 4 hours, thereby obtaining a polyglycerol stearic acid ester as a reaction product. The thus obtained polyglycerol fatty acid ester (hereinafter referred to as "POGE A") had a percentage of esterification of 14.1%.

Production Example 2

214.3g (0.135 mol) of polyglycerol produced in the same manner as defined in Production Example 1, palmitic acid (NAA-160, produced by NIHON YUSHI CO., LTD.; purity: not less than 95%) and a 10% sodium hydroxide aqueous solution were charged into a reaction vessel, such that the molar ratio of fatty acid to polyglycerol charged was 1:1 and the amount of sodium hydroxide was 0.0025% by weight based on the total weight of these components charged. The components charged were reacted with each other in a nitrogen stream under ordinary pressure at 240° C. for 2.5 hours. Thereafter, the reaction mixture was heated to 260° C. and further reacted for 4 hours, thereby obtaining a polyglycerol palmitic acid ester as a reaction product. The thus obtained polyglycerol fatty acid ester (hereinafter referred to as "POGE B") had a percentage of esterification of 12.1%.

Production Example 3

Commercially available decaglycerol (polyglycerol #750, produced by SAKAMOTO YAKUHIN CO., LTD.; average degree of polymerization: 10.9; content of components having a degree of polymerization of not less than 8: 33%), lauric acid (SUNFAT #12, produced by LION CO., LTD.; purity: not less than 95%) and a 10% sodium hydroxide aqueous solution were charged into a reaction vessel, such that the molar ratio of fatty acid to polyglycerol charged was 0.7:1 and the amount of sodium hydroxide was 0.0025% by weight based on the total weight of these components charged. The components charged were reacted with each other in a nitrogen stream under ordinary pressure at 240° C. for 2.5 hours. Thereafter, the reaction mixture was heated to 260° C. and further reacted for 4 hours, thereby obtaining a polyglycerol lauric acid ester as a reaction product. The thus obtained polyglycerol fatty acid ester (hereinafter referred to as "POGE C") had a percentage of esterification of 18.2%.

Production Example 4

Commercially available decaglycerol (polyglycerol #750, produced by SAKAMOTO YAKUHIN CO., LTD.; average degree of polymerization: 10.9; content of components having a degree of polymerization of not less than 8: 33%), stearic acid (stearic acid 750, produced by NIHON YUSHI CO., LTD., and containing 75% by weight of stearic acid and 25% by weight of palmitic acid) and a 10% sodium hydroxide aqueous solution were charged into a reaction vessel, such that the molar ratio of fatty acid to polyglycerol charged was 1:1 and the amount of sodium hydroxide was 0.0025% by weight based on the total weight of these components charged. The components charged were reacted with each other in a nitrogen stream under ordinary pressure at 240° C. for 2.5 hours. Thereafter, the reaction mixture was heated to 260° C. and further reacted for 4 hours, thereby obtaining a polyglycerol stearic acid ester as a reaction product. The thus obtained polyglycerol fatty acid ester (hereinafter referred to as "POGE D") had a percentage of esterification of 23.4%.

Production Example 5

The polyglycerol produced in the same manner as defined in Production Example 1 which contained components having a degree of polymerization of not less than 8 in an amount of not less than 90% by weight based on the weight of the ester-constituting polyglycerol, and had an average degree of polymerization of 21.3 when calculated from a hydroxyl value thereof, was mixed with commercially available decaglycerol (polyglycerol #750, produced by SAKAMOTO YAKUHIN CO., LTD.; average degree of polymerization: 10.9; content of components having a degree of polymerization of not less than 8: 33%) at a weight ratio of 85:15. The resultant mixture contained the components having a degree of polymerization of not less than 8 in an amount of not less than 83.9% by weight based on the weight of the mixture and had an average degree of polymerization of 19.7 when calculated from a hydroxyl value thereof.

210.3 g (0.143 mol) of the thus mixed polyglycerol, stearic acid (stearic acid 750, produced by NIHON YUSHI CO., LTD., and containing 75% by weight of stearic acid and 25% by weight of palmitic acid) and a 10% sodium hydroxide aqueous solution were charged into a reaction vessel, such that the molar ratio of fatty acid to polyglycerol charged was 1:1 and the amount of sodium hydroxide was 0.0025% by weight based on the total weight of these components charged. The components charged were reacted with each other in a nitrogen stream under ordinary pressure at 240° C. for 2.5 hours. Thereafter, the reaction mixture was heated to 260° C. and further reacted for 4 hours, thereby obtaining a polyglycerol stearic acid ester as a reaction product. The thus obtained polyglycerol fatty acid ester (hereinafter referred to as "POGE E") had a percentage of esterification of 14.5%.

Production Example 6

The polyglycerol produced in the same manner as in Production Example 1 which contained components having a degree of polymerization of not less than 8 in an amount of not less than 90% by weight based on the weight of the ester-constituting polyglycerol and had an average degree of polymerization of 21.3 when calculated from a hydroxyl value thereof, was mixed with commercially available decaglycerol (polyglycerol #750, produced by SAKAMOTO YAKUHIN CO., LTD.; average degree of polymerization: 10.9; content of components having a degree of polymerization of not less than 8: 33%) at a weight ratio of 75:25. The resultant mixture contained 76.5% of the components having a degree of polymerization of not less than 8 in an amount of not less than 76.5% by weight based on the weight of the mixture, and had an average degree of polymerization of 18.7 when calculated from a hydroxyl value thereof.

208.5 g (0.149 mol) of the thus mixed polyglycerol, stearic acid (stearic acid 750, produced by NIHON YUSHI CO., LTD. and containing 75% by weight of stearic acid and 25% by weight of palmitic acid) and a 10% sodium hydroxide aqueous solution were charged into a reaction vessel, such that the molar ratio of fatty acid to polyglycerol charged was 1:1 and the amount of sodium hydroxide was 0.0025% by weight based on the total weight of these components charged. The components charged were reacted with each other in a nitrogen stream under ordinary pressure at 240° C. for 2.5 hours. Thereafter, the reaction mixture was heated to 260° C. and further reacted for 4 hours, thereby obtaining a polyglycerol stearic acid ester as a reaction product. The thus obtained polyglycerol fatty acid ester (hereinafter referred to as "POGE F") had a percentage of esterification of 14.7%.

Production Example 7

The polyglycerol produced in the same manner as in Production Example 1 which contained components having a degree of polymerization of not less than 8 in an amount of not less than 90% by weight based on the weight of the ester-constituting polyglycerol, and had an average degree of polymerization of 21.3 when calculated from a hydroxyl value thereof, was mixed with commercially available decaglycerol (polyglycerol #750, produced by SAKAMOTO YAKUHIN CO., LTD.; average degree of polymerization: 10.9; content of components having a degree of polymerization of not less than 8: 33%) at a weight ratio of 55:45. The resultant mixture contained the components having a degree of polymerization of not less than 8 in an amount of not less than 64.0% by weight based on the weight of the mixture, and had an average degree of polymerization of 16.6 when calculated from a hydroxyl value thereof.

204.3 g (0.164 mol) of the thus obtained polyglycerol, stearic acid (stearic acid 750, produced by NIHON YUSHI CO., LTD., and containing 75% by weight of stearic acid and 25% by weight of palmitic acid) and 10% sodium hydroxide aqueous solution were charged into a reaction vessel, such that the molar ratio of fatty acid to polyglycerol charged was 1:1 and the amount of sodium hydroxide was 0.0025% by weight based on the total weight of these components charged. The components charged were reacted with each other in a nitrogen stream under ordinary pressure at 240° C. for 2.5 hours. Thereafter, the reaction mixture was heated to 260° C. and further reacted for 4 hours, thereby obtaining a polyglycerol stearic acid ester as a reaction product. The thus obtained polyglycerol fatty acid ester (hereinafter referred to as "POGE G") had a percentage of esterification of 15.0%.

Production Example 8

122.0g (0.077 mol) of polyglycerol produced in the same manner as in Production Example 1 which contained components having a degree of polymerization of not less than 8 in an amount of not less than 90% by weight based on the weight of the ester-constituting polyglycerol and had an average degree of polymerization of 21.3 when calculated from a hydroxyl value thereof, stearic acid (stearic acid 750, produced by NIHON YUSHI CO., LTD., and containing 75% by weight of stearic acid and 25% by weight of palmitic acid) and a 10% sodium hydroxide aqueous solution were charged into a reaction vessel, such that the molar ratio of fatty acid to polyglycerol charged was 6:1 and the amount of sodium hydroxide was 0.0025% by weight based on the total weight of these components charged. The components charged were reacted with each other in a nitrogen stream under ordinary pressure at 240° C. for 2.5 hours. Thereafter, the reaction mixture was heated to 260° C. and further reacted for 4 hours, thereby obtaining a polyglycerol stearic acid ester as a reaction product. The thus obtained polyglycerol fatty acid ester (hereinafter referred to as "POGE H") had a percentage of esterification of 31.6%.

In the following Examples and Comparative Examples, various hydrosol compositions were produced by using the above-produced POGEs A to H, POGE I (produced by MITSUBISHI CHEMICAL CORP.; content of components having a degree of polymerization of not less than 8 in the ester-constituting polyglycerol chain: 33%; ester-constituting fatty acid: stearic acid (containing 75% by weight of stearic acid and 25% by weight of palmitic acid); percentage of esterification: 24.5%) and POGE J (produced by TAIYO KAGAKU CO., LTD.; content of components having a degree of polymerization of not less than 8 in the ester-constituting polyglycerol chain: 21.9%; ester-constituting fatty acid:

myristic acid (containing 99.6% by weight of myristic acid); percentage of esterification: 13.7%). Details of the fatty acid esters (POGEs A to J) used are shown in Table 1 below. Incidentally, in Table 1, n represents a degree of polymerization of the respective polyglycerols used.

TABLE 1

| POGE | Content of n ≥ 8 components (%) | Average degree of polymerization of polyglycerol | Average percentage of esterification (%) |
|---|---|---|---|
| A | 90.0 | 21.3 | 14.1 |
| B | 90.0 | 21.3 | 12.1 |
| C | 33.0 | 10.9 | 18.2 |
| D | 33.0 | 10.9 | 23.4 |
| E | 83.9 | 19.7 | 14.5 |
| F | 76.5 | 18.7 | 14.7 |
| G | 64.0 | 16.6 | 15.0 |
| H | 90.0 | 21.3 | 31.6 |
| I | 33.0 | 10.9 | 21.4 |
| J | 21.9 | 5.0 | 13.7 |

Examples 1 to 2 and Comparative Examples 1 to 4

One part by weight of each polyglycerol fatty acid ester shown in Table 1 (as a net weight of polyglycerol fatty acid ester excluding the residual unreacted polyglycerol in the reaction mixture) was added to one part by weight of guaranteed D,L-α-tocopherol (vitamin E) (produced by TOKYO KASEI CO., LTD.) as an oil-soluble material. These components were stirred and mixed together at 110° C.

The thus obtained mixture was diluted with 50 ml of an aqueous citric acid solution having a pH of 3, such that the concentration of vitamin E was 500 ppm, and shaken for 2 hours by a shaker. The obtained hydrosol compositions were allowed to stand at 20° C. for one day and for one year, and then measured by SHIMAZU UV-1200 to determine a transmittance thereof at a wavelength of 600 nm. The results are shown in Table 2.

TABLE 2

| Examples and Comparative Examples | POGE used | Transmittance (%) | | |
|---|---|---|---|---|
| | | After one day | After one year | Difference |
| Example 1 | POGE A | 85.1 | 84.4 | −0.7 |
| Example 2 | POGE B | 63.3 | 62.5 | −0.8 |
| Comparative Example 1 | POGE C | 70.6 | 60.3 | −10.3 |
| Comparative Example 2 | POGE D | 73.5 | 65.2 (precipitated) | −8.3 |
| Comparative Example 3 | POGE I | 76.3 | 66.3 (precipitated) | −10.0 |
| Comparative Example 4 | POGE J | 61.3 | 52.6 | −8.7 |

Figure 1:
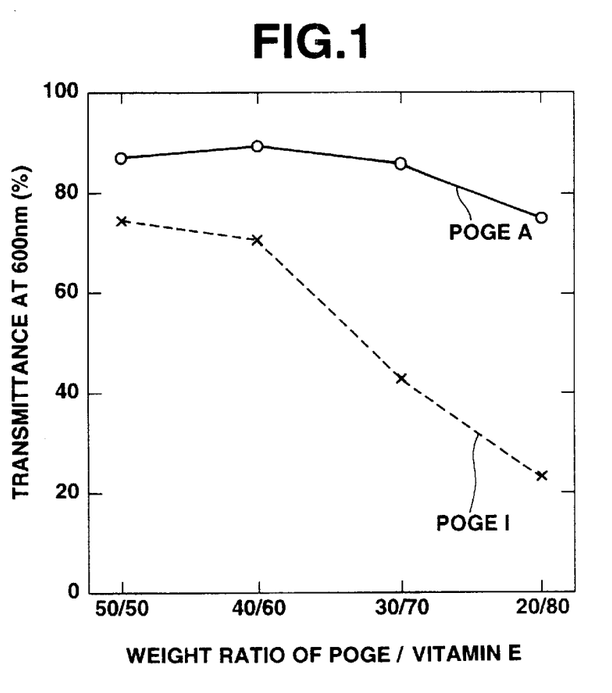
FIG. 1 is a view showing transmittances of hydrosol compositions containing POGE and vitamin E at respective weight ratios, which were measured at a wavelength of 600 nm after allowing the compositions to stand for one day.
Figure 2:
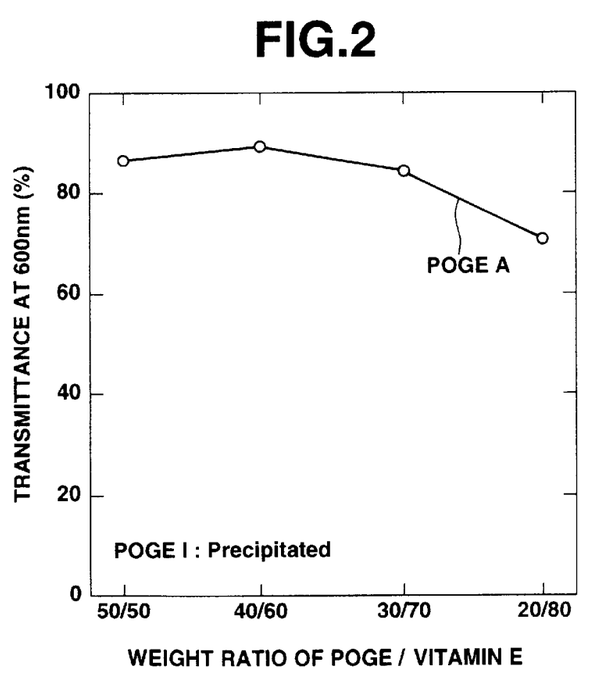
FIG. 2 is a view showing transmittances of hydrosol compositions containing POGE and vitamin E at respective weight ratios, which were measured at a wavelength of 600 nm after allowing the compositions to stand for one year.

Further, with respect to the POGE A and the POGE I (Comparative Example) both showing a high transmittance, the weight ratio of the polyglycerol fatty acid ester to vitamin E was varied from 50/50 to 20/80 to produce various hydrosol compositions. The thus obtained hydrosol compositions were allowed to stand at 20° C. for one day and for one year, and thereafter measured by SHIMAZU UV-1200 to determine a transmittance thereof at a wavelength of 600 nm. The results are shown in FIGS. 1 (stand for one day) and 2 (stand for one year).

Examples 3 to 4 and Comparative Examples 5 to 7

One part by weight of each polyglycerol fatty acid ester shown in Table 3 (as a net weight of polyglycerol fatty acid ester excluding a residual unreacted polyglycerol in the reaction mixture) was added to one part by weight of orange oil (CKY-3221, produced by KYOWA KORYO CO., LTD.) as an oil-soluble material. These components were stirred and mixed together at 110° C. to obtain a mixture.

The thus obtained mixture was diluted with 50 ml of an aqueous citric acid solution having a pH of 3 such that the concentration of the orange oil was 500 ppm, and shaken for 2 hours by a shaker. The obtained hydrosol compositions were allowed to stand at 20° C. for one day and for one year, and then measured by SHIMAZU UV-1200 to determine a transmittance thereof at a wavelength of 600 nm. The results are shown in Table 3.

TABLE 3

| Examples and Comparative Examples | POGE used | Transmittance (%) After one day | After one year | Difference |
|---|---|---|---|---|
| Example 3 | POGE A | 83.6 | 82.6 | −1.0 |
| Example 4 | POGE B | 77.4 | 76.2 | −1.2 |
| Comparative Example 5 | POGE C | 50.2 | 43.0 | −7.2 |
| Comparative Example 6 | POGE D | 72.2 | 55.3 (precipitated) | −16.9 |
| Comparative Example 7 | POGE I | 57.8 | 53.7 (precipitated) | −4.1 |

Figure 3:
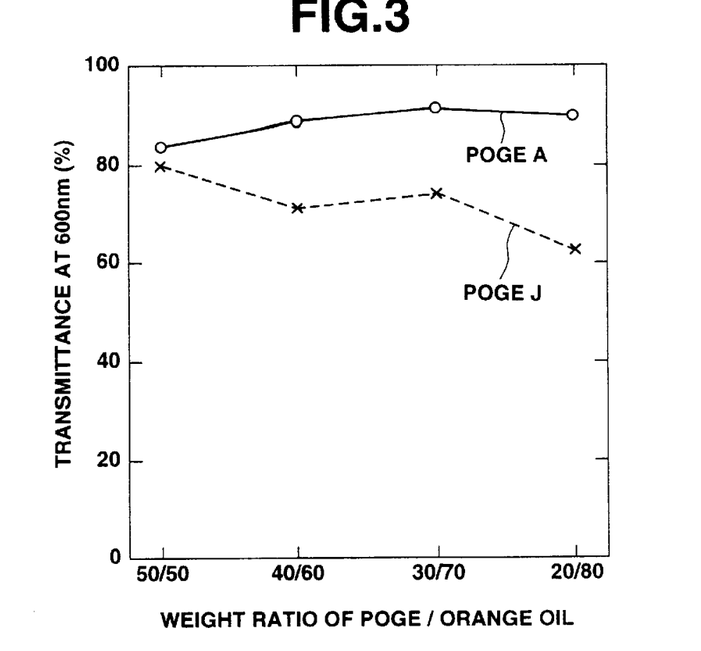
FIG. 3 is a view showing transmittances of hydrosol compositions containing POGE and orange oil at respective weight ratios, which were measured at a wavelength of 600 nm after allowing the compositions to stand for one day.
Figure 4:
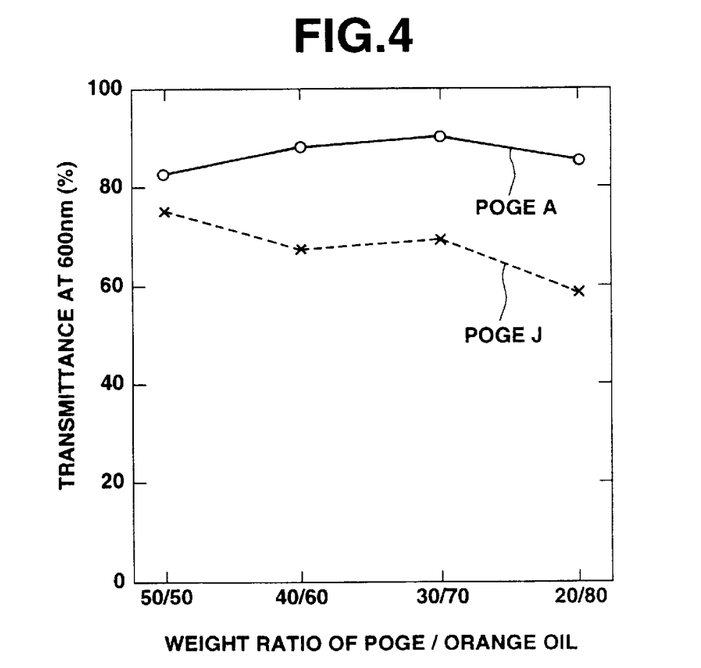
FIG. 4 is a view showing transmittances of hydrosol compositions containing POGE and orange oil at respective weight ratios, which were measured at a wavelength of 600 nm after allowing the compositions to stand for one year.

Further, with respect to the POGE A and the POGE J (Comparative Example) both showing a high transmittance, the weight ratio of the polyglycerol fatty acid ester to the orange oil was varied from 50/50 to 20/80 to produce various hydrosol compositions. The thus obtained hydrosol compositions were allowed to stand at 20° C. for one day and for one year, and thereafter measured by SHIMAZU UV-1200 to determine a transmittance thereof at a wavelength of 600 nm. The results are shown in FIGS. 3 (stand for one day) and 4 (stand for one year).

Examples 5 to 6 and Comparative Examples 8 to 11

One part by weight of each polyglycerol fatty acid ester shown in Table 4 (as a net weight of polyglycerol fatty acid ester excluding a residual unreacted polyglycerol in the reaction mixture) was added to one part by weight of edible DHA oil (produced by NIPPON GOSEI KAGAKU CO., LTD.) as an oil-soluble material. These components were stirred and mixed together at 110° C.

The thus obtained mixture was diluted with 50 ml of an aqueous citric acid solution having a pH of 3 such that the concentration of the DHA was 500 ppm, and shaken for 2 hours by a shaker. The obtained hydrosol compositions were allowed to stand at 20° C. for one day and for one year, and thereafter measured by SHIMAZU UV-1200 to determine a transmittance thereof at a wavelength of 600 nm. The results are shown in Table 4.

TABLE 4

| Examples and Comparative Examples | POGE used | Transmittance (%) After one day | After one year | Difference |
|---|---|---|---|---|
| Example 5 | POGE A | 72.3 | 78.1 | 5.8 |
| Example 6 | POGE B | 77.3 | 82.7 | 5.4 |
| Comparative Example 7 | POGE C | 57.8 | 52.9 | −4.9 |

TABLE 4-continued

| Examples and Comparative Examples | POGE used | Transmittance (%) After one day | After one year | Difference |
|---|---|---|---|---|
| Example 8 Comparative Example 9 | POGE D | 55.9 (precipitated) | 50.3 (precipitated) | −5.6 |
| Comparative Example 10 | POGE I | 44.3 (precipitated) | 40.1 (precipitated) | −4.2 |
| Comparative Example 11 | POGE J | 59.2 (precipitated) | 51.2 (precipitated) | −8.0 |

Figure 5:
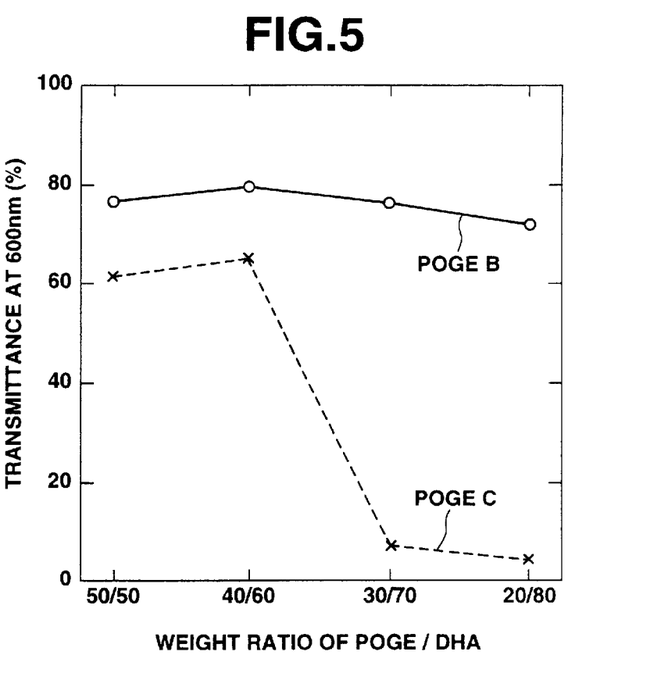
FIG. 5 is a view showing transmittances of hydrosol compositions containing POGE and edible DHA oil at respective weight ratios, which were measured at a wavelength of 600 nm after allowing the compositions to stand for one day.
Figure 6:
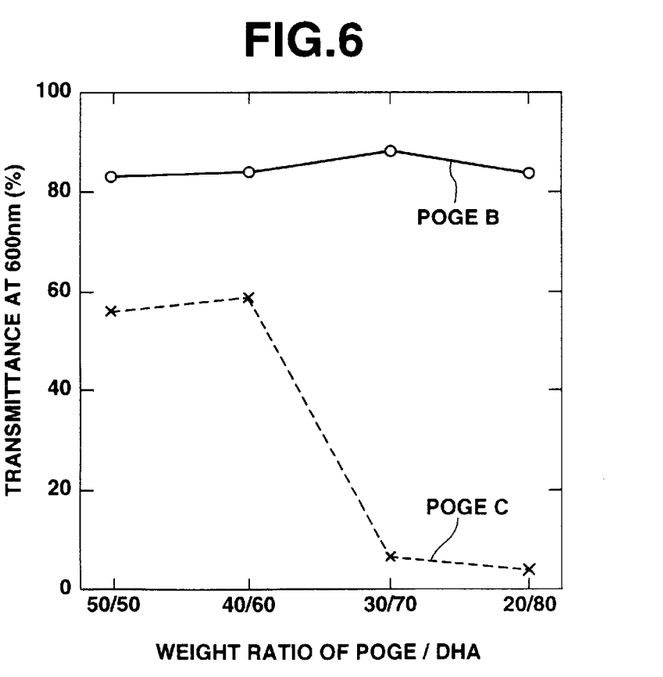
FIG. 6 is a view showing transmittances of hydrosol compositions containing POGE and edible DHA oil at respective weight ratios, which were measured at a wavelength of 600 nm after allowing the compositions to stand for one year.

Further, with respect to the POGE B and the POGE C (Comparative Example) both showing a higher transmittance, the weight ratio of the polyglycerol fatty acid ester to the DHA was varied from 50/50 to 20/80 to produce various hydrosol compositions. The thus obtained hydrosol compositions were allowed to stand at 20° C. for one day and for one year, and thereafter measured by SHIMAZU UV-1200 to determine a transmittance thereof at a wavelength of 600 nm. The results are shown in FIGS. 5 (stand for one day) and 6 (stand for one year).

Examples 7 to 8 and Comparative Example 12

One part by weight of each of the POGE E (Example 7), the POGE F (Example 8) and the POGE G (Comparative Example 12) (as a net weight of polyglycerol fatty acid ester excluding the residual unreacted polyglycerol in the reaction mixture) was added to one part by weight of guaranteed D,L-α-tocopherol (vitamin E) (produced by TOKYO KASEI CO., LTD.) as an oil-soluble material. These components were stirred and mixed together at 110° C.

Figure 7:
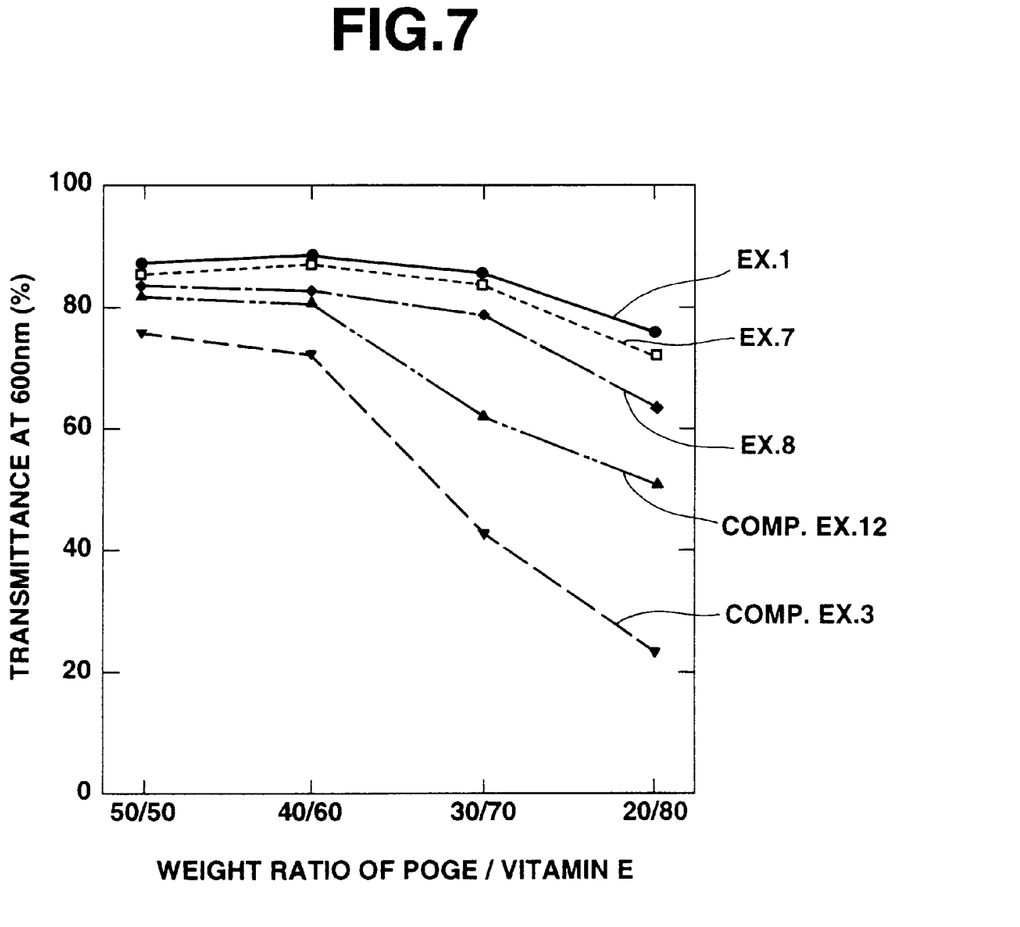
FIG. 7 is a view showing transmittances of hydrosol compositions containing POGE and vitamin E at respective weight ratios in Examples 1, 7 and 8, and Comparative Examples 3 and 12, which were measured at a wavelength of 600 nm after allowing the compositions to stand for one day.

The thus obtained mixture was diluted with 50 ml of an aqueous citric acid solution having a pH of 3 such that the concentration of the vitamin E was 500 ppm, and shaken for 2 hours by a shaker. The obtained hydrosol compositions were allowed to stand at 20° C. for one day, and then measured by SHIMAZU UV-1200 to determine a transmittance thereof at a wavelength of 600 nm. Further, the weight ratio of the polyglycerol fatty ester to the vitamin E was varied from 50/50 to 20/80 to produce various hydrosol compositions. The thus obtained hydrosol compositions were allowed to stand at 20° C. for one day, and thereafter measured by SHIMAZU UV-1200 to determine a transmittance thereof at a wavelength of 600 nm. The results are shown in Table 5 and FIG. 7.

TABLE 5

| | Transmittance (%) | | | | |
|---|---|---|---|---|---|
| POGE/VE | Example 1 POGE A | Example 7 POGE E | Example 8 POGE F | Comparative Example 12 POGE G | Comparative Example 3 POGE I |
| 50/50 | 87.0 | 85.6 | 83.5 | 82.8 | 74.9 |
| 40/60 | 89.2 | 87.5 | 83.1 | 80.9 | 71.2 |
| 30/70 | 85.9 | 83.7 | 78.3 | 62.8 | 42.7 |
| 20/80 | 75.5 | 71.5 | 63.8 | 50.3 | 23.4 |

Comparative Example 13

One part by weight of the POGE H (as a net weight of polyglycerol fatty acid ester excluding the residual unreacted polyglycerol in the reaction mixture) was added to one part by weight of guaranteed D,L-α-tocopherol (vitamin E) (produced by TOKYO KASEI CO., LTD.) as an oil-soluble material. These components were stirred and mixed together at 110° C.

The thus obtained mixture was diluted with 50 ml of an aqueous citric acid solution having a pH of 3 such that the concentration of the vitamin E was 500 ppm, and shaken for 2 hours by a shaker. The obtained hydrosol composition was allowed to stand at 20° C. for one day, and then measured by SHIMAZU UV-1200 to determine a transmittance thereof at a wavelength of 600 nm. As a result, the transmittance of the hydrosol composition was 52.6%.

As is apparent from the above-mentioned results of Examples and Comparative Examples, the POGE-containing solubilizing agents obtained according to the present invention can exhibit a high solubilizing property irrespective of kinds of oil-soluble materials to be solubilized. In addition, as compared to conventional solubilizing agents, many kinds of oil-soluble materials can be solubilized to form a transparent solution thereof by using the solubilizing agent according to the present invention.

What is claimed is:

1. A solubilizing agent comprising a polyglycerol fatty acid ester, an ester-constituting polyglycerol of the polyglycerol fatty acid ester comprising polyglycerol having a degree of polymerization of not less than 8 in an amount of not less than 70% by weight based on the weight of the ester-constituting polyglycerol.

2. A solubilizing agent comprising a polyglycerol fatty acid ester, an ester-constituting polyglycerol of the polyglycerol fatty acid ester comprising polyglycerol having a degree of polymerization of not less than 8 in an amount of not less than 90% by weight based on the weight of the ester-constituting polyglycerol.

3. A solubilizing agent according to claim 1 or claim 2, wherein said ester-constituting polyglycerol has an average degree of polymerization of not less than 18.

4. A solubilizing agent comprising a polyglycerol fatty acid ester, an ester-constituting polyglycerol of the polyglycerol fatty acid ester having an average degree of polymerization of 18 to 22, and comprising polyglycerol having a degree of polymerization of not less than 8 in an amount of not less than 90% by weight based on the weight of the ester-constituting polyglycerol.

5. A solubilizing agent according to any of claims 1, 2 and 4, wherein said ester has a percentage of esterification of not more than 30%.

6. A solubilizing agent according to any of claims 1, 2 and 4, wherein said ester-constituting fatty acid comprises a saturated fatty acid having 14 to 18 carbon atoms in an amount of not less than 70% by weight based on the weight of the ester-constituting fatty acid.

7. A hydrosol composition comprising:

an aqueous solvent;

a solubilizing agent comprising a polyglycerol fatty acid ester, an ester-constituting polyglycerol of the polyglycerol fatty acid ester comprising polyglycerol having a degree of polymerization of not less than 8 in an amount of not less than 70% by weight based on the weight of the ester-constituting polyglycerol; and an oil-soluble material solubilized in said aqueous solvent by said solubilizing agent.

8. A hydrosol composition comprising:

an aqueous solvent;

a solubilizing agent comprising a polyglycerol fatty acid ester, an ester-constituting polyglycerol of the polyglycerol fatty acid ester comprising polyglycerol having a degree of polymerization of not less than 8 in an amount of not less than 90% by weight based on the weight of the ester-constituting polyglycerol; and an oil-soluble material solubilized in said aqueous solvent by said solubilizing agent.

9. A hydrosol composition according to claim 7 or claim 8, wherein said ester-constituting polyglycerol has an average degree of polymerization of not less than 18.

10. A hydrosol composition comprising:

an aqueous solvent;

a solubilizing agent comprising a polyglycerol fatty acid ester, an ester-constituting polyglycerol of the polyglycerol fatty acid ester having an average degree of polymerization of 18 to 22, and comprising polyglycerol having a degree of polymerization of not less than 8 in an amount of not less than 90% by weight based on the weight of the ester-constituting polyglycerol; and an oil-soluble material solubilized in said aqueous solvent by said solubilizing agent.

11. A hydrosol composition according to any of claims 7, 8 and 10, wherein said ester has a percentage of esterification of not more than 30%.

12. A hydrosol composition according to any of claims 7, 8 and 10, wherein an ester-constituting fatty acid of the polyglycerol fatty acid ester comprises a saturated fatty acid having 14 to 18 carbon atoms in an amount of not less than 70% by weight based on the weight of the ester-constituting fatty acid.

13. A hydrosol composition according to any of claims 7, 8 and 10, wherein the weight ratio of said solubilizing agent to said oil-soluble material is 10:1 to 1:4.

14. A hydrosol composition according to any of claims 7, 8 and 10, wherein the content of said oil-soluble material in the hydrosol composition is 10 to 10,000 ppm.

* * * * *